United States Patent
Chung et al.

(10) Patent No.: US 9,749,455 B2
(45) Date of Patent: Aug. 29, 2017

(54) ELECTRONIC DEVICE AND METHOD FOR SENDING MESSAGES USING THE SAME

(71) Applicant: Samsung Electronics Co., Ltd., Suwon-si, Gyeonggi-do (KR)

(72) Inventors: Ji-Ryang Chung, Suwon-si (KR); Suck-Ho Seo, Suwon-si (KR); Sung-Ho Park, Gwangju (KR); Dong-Hyoun Son, Suwon-si (KR); Il-Sung Hong, Seoul (KR); Ji-Hyun Park, Seongnam-si (KR); Ki-Soo Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/837,536

(22) Filed: Aug. 27, 2015

(65) Prior Publication Data

US 2016/0065720 A1 Mar. 3, 2016

(30) Foreign Application Priority Data

Aug. 29, 2014 (KR) ........................ 10-2014-0114081

(51) Int. Cl.
| | |
|---|---|
| *H04M 3/00* | (2006.01) |
| *H04M 1/725* | (2006.01) |
| *H04L 12/725* | (2013.01) |
| *H04L 29/06* | (2006.01) |
| *H04W 72/10* | (2009.01) |
| *H04W 4/00* | (2009.01) |

(52) U.S. Cl.
CPC ...... *H04M 1/72533* (2013.01); *H04L 45/306* (2013.01); *H04L 65/4076* (2013.01); *H04W 72/10* (2013.01); *H04W 4/005* (2013.01)

(58) Field of Classification Search
CPC ....................................................... G05B 15/02
USPC ............................................................ 455/420
See application file for complete search history.

(56) References Cited

U.S. PATENT DOCUMENTS

| | | | |
|---|---|---|---|
| 9,159,217 B1* | 10/2015 | Logan .................. | G05B 19/042 |
| 2010/0142484 A1 | 6/2010 | Bachmann et al. | |
| 2010/0286801 A1* | 11/2010 | Yum .................... | H04L 12/2809 |
| | | | 700/90 |
| 2011/0187928 A1* | 8/2011 | Crabtree ................ | G05B 23/02 |
| | | | 348/553 |

(Continued)

FOREIGN PATENT DOCUMENTS

| | | |
|---|---|---|
| KR | 10-2006-0123309 A | 12/2006 |
| KR | 10-2012-0015383 A | 2/2012 |
| KR | 10-2012-0092769 A | 8/2012 |

*Primary Examiner* — Sam K Ahn
*Assistant Examiner* — Fabricio R Murillo Garcia
(74) *Attorney, Agent, or Firm* — Jefferson IP Law, LLP

(57) ABSTRACT

An electronic device is provided. The electronic device includes a communication unit configured to communicate with at least one a first electronic device or at least one second external device by at least one communication method, and a control unit configured to, when a message is received from the first electronic device, identify at least one of the second electronic device to which a message is sent in response to the message received from the first electronic device, create the message that is to be sent to the identified second electronic device, and send the created message to the second electronic device. Other various embodiments may be provided.

19 Claims, 12 Drawing Sheets

(56) References Cited

U.S. PATENT DOCUMENTS

| | | | |
|---|---|---|---|
| 2013/0106587 A1* | 5/2013 | Reams | G05B 15/02 340/12.52 |
| 2013/0106613 A1* | 5/2013 | Lee | H04W 4/021 340/691.3 |
| 2014/0241354 A1 | 8/2014 | Shuman et al. | |

* cited by examiner

A. Select graphical mode    B. Display graphical mode

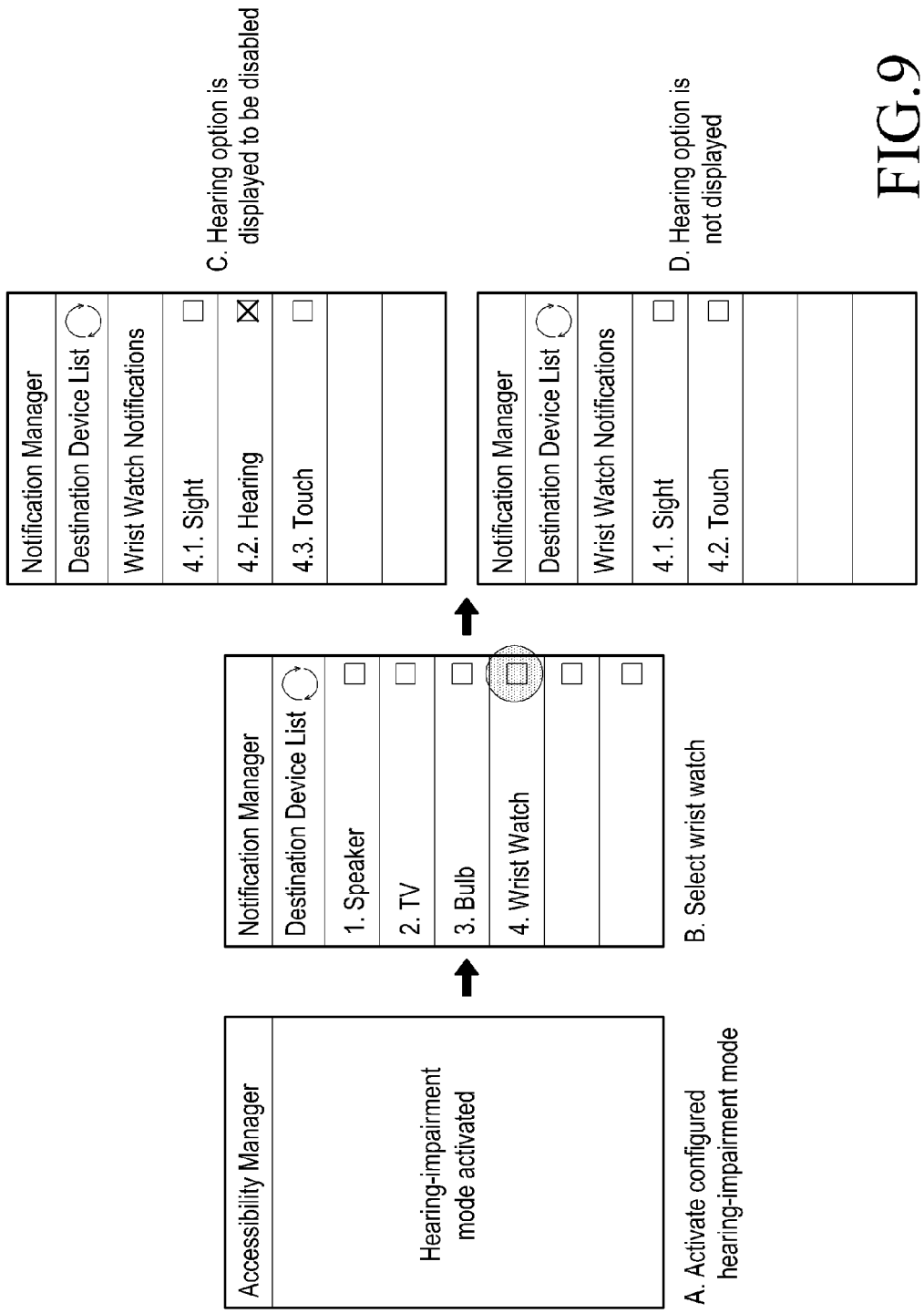

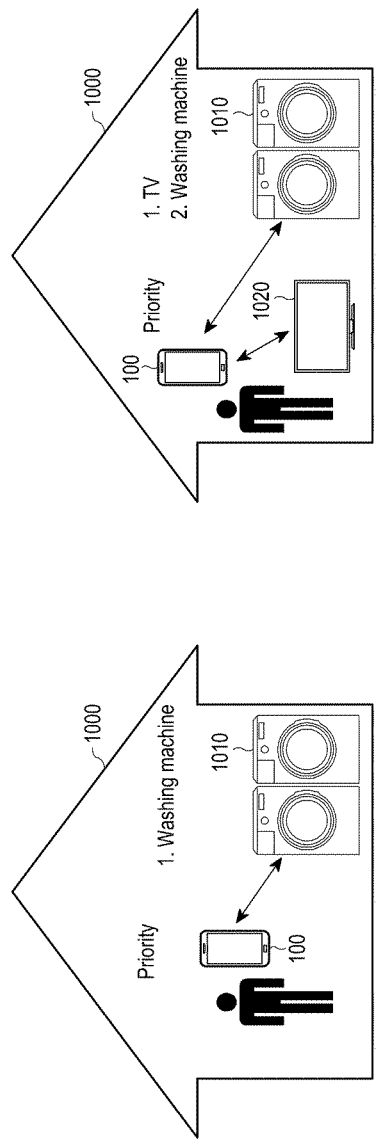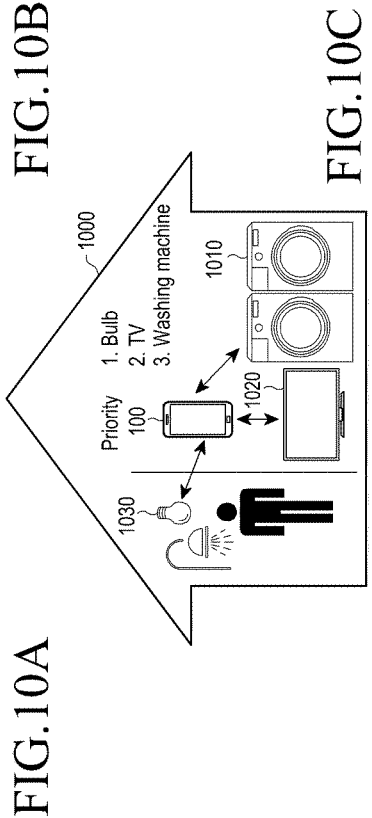
FIG.10A
FIG.10B
FIG.10C

ELECTRONIC DEVICE AND METHOD FOR SENDING MESSAGES USING THE SAME

CROSS-REFERENCE TO RELATED APPLICATION(S)

This application claims the benefit under 35 U.S.C. §119(a) of a Korean patent application filed on Aug. 29, 2014 in the Korean Intellectual Property Office and assigned Serial No. 10-2014-0114081, the entire disclosure of which is hereby incorporated by reference.

TECHNICAL FIELD

The present disclosure relates to an electronic device and a method for sending messages by using the electronic device.

BACKGROUND

Recently, various additional services and functions have been provided by electronic devices. It is a recent trend to provide a service that allows devices to interwork with each other and control each other by means of a communication function such as the Internet of things (IoT). In order to upgrade the effective value of the electronic devices and to satisfy various desires of the user, various functions that can be executed in the electronic devices have been developed.

The electronic device may be connected with external devices by a communication means to thereby transmit and receive data to and from the external devices. As described above, the external devices may be connected with the electronic device (e.g., smart phones) that provides various communication means.

However, the external devices may be based on different communication means.

The above information is presented as background information only to assist with an understanding of the present disclosure. No determination has been made, and no assertion is made, as to whether any of the above might be applicable as prior art with regard to the present disclosure.

SUMMARY

Since the external devices may use different communication means, the connection between external devices may be impossible.

Therefore, the external devices may not send and receive messages between themselves.

Aspects of the present disclosure are to address at least the above-mentioned problems and/or disadvantages and to provide at least the advantages described below. Accordingly, an aspect of the present disclosure is to provide an electronic device and a transmission method of the electronic device by which the electronic device is connected with the external devices through various communication means to thereby send messages or information (e.g., notification information) of the external devices.

In accordance with an aspect of the present disclosure, a method is provided. The method includes receiving a message from at least one first electronic device among a plurality of electronic devices that use different communication methods from each other to thereby make communication with an electronic device, identifying at least one second electronic device, to which a message is sent, from among the plurality of electronic devices in response to the message from the first electronic device, creating the message that is to be sent to the identified second electronic device, and sending the created message to the second electronic device.

In accordance with another aspect of the present disclosure, an electronic device is provided. The electronic device includes a communication unit configured to communicate with at least one first electronic device among a plurality of electronic devices that use different communication methods from each other to thereby make communication with the electronic device, and a control unit configured to, when a message is received from the first electronic device, identify at least one second electronic device, from among the plurality of electronic devices, to which a message is sent in response to the message received from the first electronic device, create the message that is to be sent to the identified second electronic device, and send the created message to the second electronic device.

In accordance with another aspect of the present disclosure, an electronic device is connected with external devices to thereby send messages or information (e.g., notification information) of the external devices so that transmission and reception of messages or information (e.g., notification messages) can be made between the external devices that may be based on different communication means.

In accordance with another embodiment of the present disclosure, an external device may receive messages or information (e.g., notification information) from an electronic device, and may control itself on the basis of the messages or information (e.g., notification information) to thereby reduce power consumption.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 illustrates an example in which an electronic device displays messages or information that can be notified by a second external device according to various embodiments of the present disclosure;

FIGS. 10A, 10B, and 10C illustrate priority of external devices, which is configured by an electronic device according to various embodiments of the present disclosure;

Throughout the drawings, it should be noted that like reference numbers are used to depict the same or similar elements, features, and structures.

DETAILED DESCRIPTION

Figure 1:
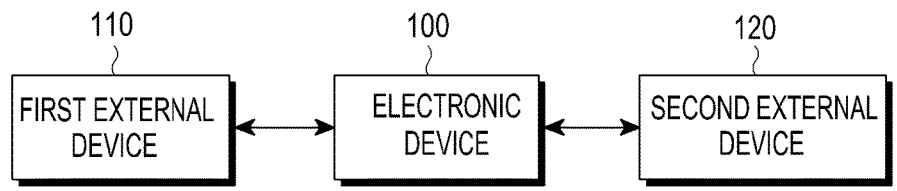
FIG. 1 is a diagram illustrating a system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms including an ordinal number such as first, second, etc. can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element. As used herein, the term "and/or" includes any and all combinations of one or more associated items.

The terms used herein are merely used to describe specific embodiments, and are not intended to limit the present disclosure. As used herein, the singular forms are intended to include the plural forms as well, unless the context clearly indicates otherwise. In the description, it should be understood that the terms "include" or "have" indicate the existence of a feature, a number, a step, an operation, a structural element, parts, or a combination thereof, and do not exclude the existences or possibility of the addition of one or more other features, numerals, steps, operations, structural elements, parts, or combinations thereof.

Unless defined differently, all terms used herein, which include technical terminologies or scientific terminologies, have the same meaning as that understood by a person skilled in the art to which the present disclosure belongs. It should be interpreted that the terms, which are identical to those defined in general dictionaries, have the meaning identical to that in the context of the related technique. The terms should not be ideally or excessively interpreted as having a formal meaning.

In the following description of various embodiments of the present disclosure, an "electronic device" may be a device including at least one or a plurality of communication means or any device having at least one processor, and may include a camera, an electronic device, a mobile terminal, communication terminal, a portable mobile terminal, and the like. For example, the electronic device may be a digital camera, a smart phone, a mobile phone, a game machine, a Television (TV), a display device, a head unit for a vehicle, a notebook computer, a laptop computer, a tablet computer, a Personal Media Player (PMP), a Personal Digital Assistant (PDA), a navigation device, an Automated Teller Machine (ATM) of a bank, a POS device of a shop or the like. Further, in embodiments of the present disclosure, the electronic device may be a flexible device or a flexible display unit. Further, in embodiments of the present disclosure, the electronic device may also be a wearable device (e.g., watch-type device, eyeglass-type device, or clothes-type device).

Hereinafter, various embodiments of the present disclosure will be described with reference to the accompanying drawings to allow those skilled in the art to easily understand and make the present disclosure.

FIG. 1 is a diagram illustrating a system according to various embodiments of the present disclosure.

Referring to FIG. 1, the system according to various embodiments of the present disclosure, may include an electronic device 100, a first external device 110, and a second external device 120.

The electronic device 100 may be connected with the first external device 110 and the second external device 120 by wireless or wired communication means. Therefore, the electronic device 100, for example, may receive messages or information (e.g., notification information) from the first external device 110, and may send the received messages or information (e.g., notification information) to the second external device 120. Alternatively, the electronic device 100 may receive messages or information (e.g., notification information) from the second external device 120, and may send the received messages or information (e.g., notification information) to the first external device 110. The messages or information (e.g., notification information) may include, for example, the types of the first external device 110 and the second external device 120, status information of the first external device 110 and the second external device 120, and the events that can be performed in each external device. Of course, the messages or information is not limited thereto.

As described above, the electronic device 100 may receive and send the messages or information (e.g., notification information) from and to the external devices.

The communication networks may include wired communication networks and wireless communication networks, and more specifically, may include various communication networks such as a personal area network (PAN), a local area network (LAN), or the like. In addition, the communication networks may be World Wide Web (WWW), or may utilize short-range wireless communication such as infrared data association (IrDA) or Bluetooth.

Although two external devices i.e., the first external device 110 and the second external device 120, are connected with the electronic device 100 in FIG. 1, the number of the external devices that are to be connected to the electronic device 100 is not limited by the described embodiment.

In addition, the first external device 110 and the second external device 120 may be identical or similar to each other, or they may be different from each other in the type of device. The examples of the electronic device 100, the first external device 110 and the second external device 120 will be described in more detail with reference to FIGS. 11 to 13 later.

Figure 2:
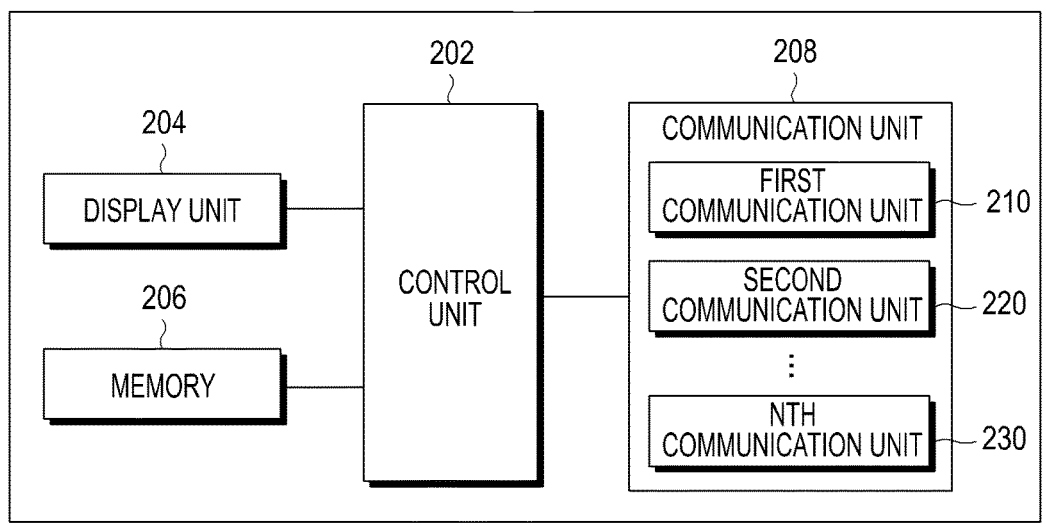
FIG. 2 is a block diagram of an electronic device according to various embodiments of the present disclosure.

FIG. 2 is a block diagram of an electronic device according to various embodiments of the present disclosure.

Referring to FIG. 2, the electronic device, which may represent the electronic device 100 or either of the external devices 110 and 120 of FIG. 1, may include a control unit 202, a display unit 204, a memory 206, and a communication unit 208.

The control unit 202 may control the display unit 204 to play the messages or information (e.g., notification information) received from the external devices. In addition, the control unit 202 may control the communication unit 208 to send the messages or information (e.g., notification information) received from the external devices to other external devices. Furthermore, the control unit 202 may control the memory 206 to store the received messages or information (e.g., notification information).

The control unit 202, according to various embodiments of the present disclosure, may control overall operations of the electronic device.

The display unit 204 may display the messages or information (e.g., notification information) received through the communication unit 208. In addition, the communication unit 204 may display the types of external devices, status information of the external devices, and events that can be performed in the external devices, based on the messages or information (e.g., notification information).

The memory 206 may store the messages or information (e.g., notification information) received through the communication unit 208.

The communication unit 208 may include a first communication unit 210 and a second communication unit 220 to an Nth communication unit 230. According to various embodiments of the present disclosure, the first communication unit 210, the second communication unit 220, and the Nth communication unit 230 may support different communication methods, respectively. For example, referring to FIG. 1, the first communication unit 210 may connect and make communication with the first external device 110, and the second communication unit 220 may connect and make communication with the second external device 120.

A method according to various embodiments of the present disclosure, may include receiving a message from at least one of first electronic devices among a plurality of electronic devices that use different communication methods from each other to thereby make communication with an electronic device, identifying at least one of second electronic devices, to which a message is sent, from among the plurality of electronic devices, in response to the message from the first electronic device, creating a message that is to be sent to the identified second electronic device, and sending the created message to the second electronic device.

According to various embodiments, the method may include connecting with the first electronic device or the second electronic device by at least one of a plurality of communication methods.

According to various embodiments, the first electronic device is connected by a first communication method, and the second electronic device is connected by a second communication method that is different from the first communication method.

According to various embodiments, the operation of receiving the message may include receiving the message that is sent from the first electronic device by a broadcasting method.

According to various embodiments, the message to be sent to the second electronic device may include information related to the status of the first electronic device.

According to various embodiments, the message to be sent to the second electronic device may include control information for the second electronic device, which is configured to correspond to the status information of the first electronic device included in the message received from the first electronic device.

According to various embodiments, the method may include, in the case of a plurality of the second electronic devices to which the message is sent, giving priority to the plurality of the second electronic devices.

According to various embodiments, the priority is given based on usage or malfunction of the second electronic devices.

According to various embodiments, the priority is adjusted depending on user information or status information.

According to various embodiments, the first electronic device and the second electronic device are a source external device and a destination external device, respectively.

Figure 3:
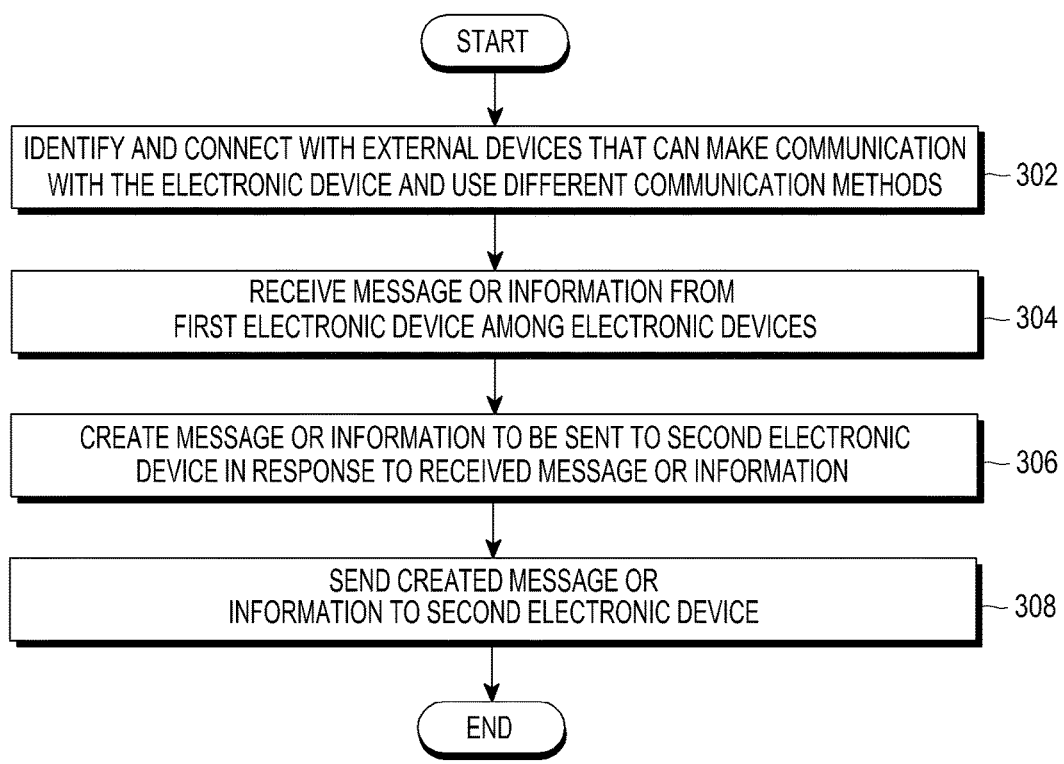
FIG. 3 is a flowchart illustrating a method for sending messages or information in an electronic device according to various embodiments of the present disclosure.

FIG. 3 is a flowchart illustrating a method for sending messages or information (e.g., notification information) in an electronic device according to various embodiments of the present disclosure.

Referring to FIG. 3, the electronic device may identify and be connected with the external devices that use different communication methods at operation 302. The present embodiment considers that the external devices are based on different communication methods.

As set forth above, when the electronic device is connected with a plurality of external devices, for example, the electronic device may receive a message or information (e.g., notification information) for controlling the second external device from the first external device among the plurality of external devices at operation 304. The message or information (e.g., notification information) may include, for example, the type of the first external device, current status information of the first external device, and events that can be executed by other external devices. Of course, the message or information is not limited thereto.

The electronic device may create a message or information (e.g., message for controlling the second external device, or notification information to be transmitted to the second external device), which is to be transmitted to the second external device, based on the received message or information (e.g., notification information) at operation 306. In addition, the electronic device may send the created message or information to the second external device at operation 308. Furthermore, the electronic device may store the message or information (e.g., notification information), or may display the same on the display unit.

Therefore, the second external device may receive the message or information (e.g., notification information) from the electronic device, and may control itself on the basis of the message or information (e.g., notification information), to thereby prevent a waste of power consumption. The second external device, in particular, may control to terminate, for example, at least one of a visual function, a hearing function and a tactile function, which are performed by the second external device, or may control to turn off the second external device. However, the control of the second external device is not limited thereto.

According to an embodiment of the present disclosure, the user may watch TV (e.g., the second external device) with the electronic device connected with the external devices. When the user goes to the rest room, the bulb (e.g., the first external device) in the rest room is turned on, and at the same time, the bulb may send a message or information (e.g., notification information, status information thereof, etc.) to the electronic device. After that, the electronic device may determine that the user is not watching TV at the moment, based on the message or information (e.g., notification information) of the bulb. Then, the electronic device may send the message or information (e.g., notification information) of the bulb to the TV. Therefore, the TV may control itself to be turned off on the basis of the message or information (e.g., notification information).

According to another embodiment of the present disclosure, when the wash cycle of a washing machine (e.g., the first external device) is completed with the electronic device connected with the external devices, the washing machine may send a notification message stating that the wash cycle is complete to the electronic device. Then, the electronic device may determine a location of the user (e.g., if the smart bulb in the rest room is turned on, the user may be determined to be in the rest room), and may send the notification message received from the washing machine to the second external device (e.g., smart bulb) that is positioned at the location of the user. Then, the smart bulb may blink in response to the notification message, and the user may recognize that the wash cycle of the washing machine is complete by identifying the blinks of the smart bulb.

According to various embodiments of the present disclosure, since the electronic device sends the messages or the information (e.g., notification information) of the external devices, the external devices that may use different communication methods, are able to send and receive the messages or the information (e.g., notification information) between the same. According to various embodiments of the present disclosure, the messages or the information (e.g., notification information) may be sent in the manner of broadcasting from the external devices to the electronic device. In addition, according to various embodiments of the present disclosure, after the external device makes a communication-connection with the electronic device, the messages or the information (e.g., notification information) may be sent by the connected communication method from the external device to the electronic device.

An electronic device according to an embodiment of the present disclosure may include a communication unit configured to communicate with at least one of the first electronic devices or at least one of the second external devices by at least one communication method and a control unit configured to, when a message is received from the first electronic device, identify at least one of the second electronic devices to which the message is sent in response to the message received from the first electronic device, create a message that is to be sent to the identified second electronic device, and send the created message to the second electronic device.

According to various embodiments, the communication unit may connect with the first electronic device or the second electronic device by at least one of a plurality of communication methods.

According to various embodiments, the communication unit may communicate with the first electronic device by the first communication method, and with the second electronic device by the second communication method that is different from the first communication method.

According to various embodiments, the communication unit may receive the message that is sent from the first electronic device by a broadcasting method.

According to various embodiments, the message to be sent to the second electronic device may include information related to the status of the first electronic device.

According to various embodiments, the message to be sent to the second electronic device may include control information for the second electronic device, which is configured to correspond to status information of the first electronic device included in the message received from the first electronic device.

According to various embodiments, the control unit, in the case of a plurality of the second electronic devices to which the message is sent, may give priority to the plurality of the second electronic devices.

According to various embodiments, the priority may be given on the basis of usage or malfunction of the second electronic devices.

According to various embodiments, the priority may be adjusted depending on user information or status information.

According to various embodiments, either of the first electronic device or the second electronic device may be a source external device or a destination external device.

Figure 4:
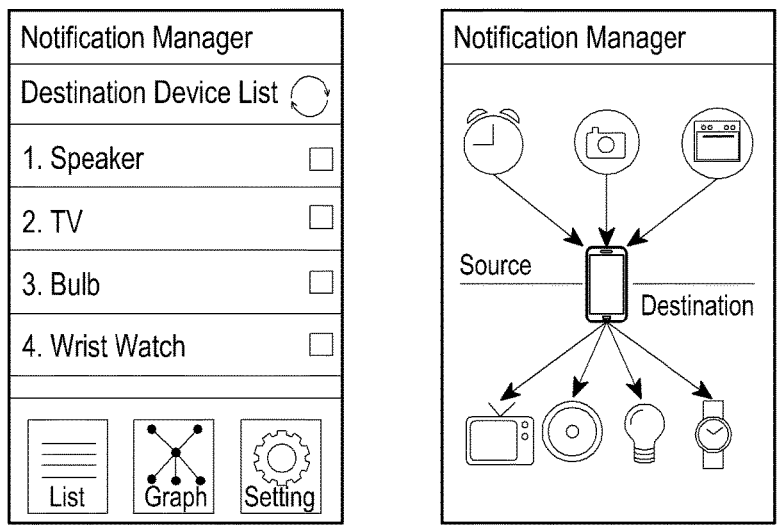
FIG. 4 illustrates an example in which an electronic device displays information showing external devices that are connected with the electronic device according to various embodiments of the present disclosure.

FIG. 4 illustrates an example in which an electronic device displays information showing external devices that are connected with the electronic device according to various embodiments of the present disclosure.

Referring to FIG. 4, the electronic device may receive the messages or information (e.g., notification information) from each of the external devices. The electronic device may configure the external devices to be source external devices and destination external devices based on the received messages or information (e.g., notification information). For example, the source external devices may be accessories such as refrigerators, washer-dryers, ovens, security cameras, alarm clocks, home control systems, or the like, but they are limited thereto. The destination external devices may be accessories such as speakers, TVs, smart bulbs, smart watches, or the like, but they are not limited thereto. The source external devices and the destination external devices may replace each other.

In an electronic device according to an embodiment of the present disclosure, the user may select a graphical mode in the "Destination Device List" of "Notification Manager" (see "A"). Then, the electronic device may control to display information (e.g., images or icons of external devices) on the external devices that can communicate with the electronic device at the moment, in the graphical mode (see "B").

Figure 5:
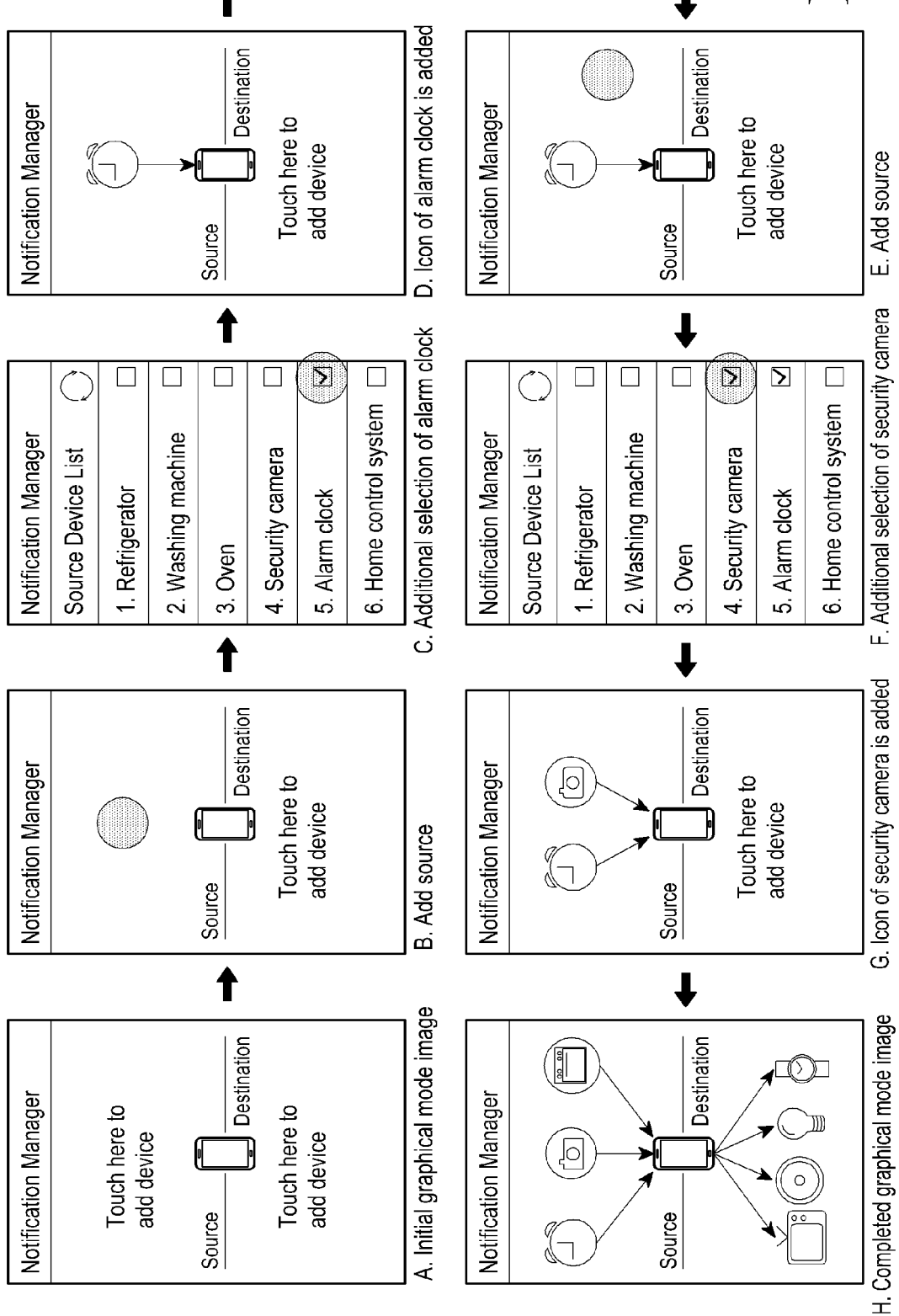
FIG. 5 illustrates an example in which an electronic device is connected with external devices according to various embodiments of the present disclosure.

FIG. 5 illustrates an example in which external devices that can communicate with the electronic device are registered according to various embodiments of the present disclosure.

Referring to FIG. 5, the electronic device may display information asking whether or not the source external devices or the destination external devices should be added (e.g., "Touch here to add devices") in the initial graphical mode image of "Notification Manager" (see "A").

Next, when the information displayed on the image is touched or selected by the user, the electronic device may add a source to the graphical mode image (see "B").

Therefore, the electronic device may display the source external devices that can be added (e.g., that can be connected) in "Source Device List". From among "1. Refrigerator," "2. Washing Machine," "3. Oven," "4. Security Camera," "4. Alarm Clock," and "6. Home Control System," if the alarm clock is touched or selected by the user (see "C"), the electronic device may control to add the icon of the alarm clock to the graphical mode image (see "D").

Subsequently, when the information displayed on the screen image of the electronic device is additionally touched or selected by the user, the electronic device may add another source to the graphical mode image (see "E").

Then, the electronic device may display the source external devices that can be added (e.g., that can be connected) in "Source Device List". From among "1. Refrigerator," "2. Washing Machine," "3. Oven," "4. Security Camera," "4. Alarm Clock," and "6. Home Control System," if the security camera is touched or selected by the user (see "F"), the electronic device may control to add the icon of the security camera to the graphical mode image (see "G").

Likewise, the destination external devices may be added in the graphical mode image according to the user's additional selection, and when addition of the destination external devices is complete, the electronic device may display the completed graphical mode image (see "H").

Figure 6:
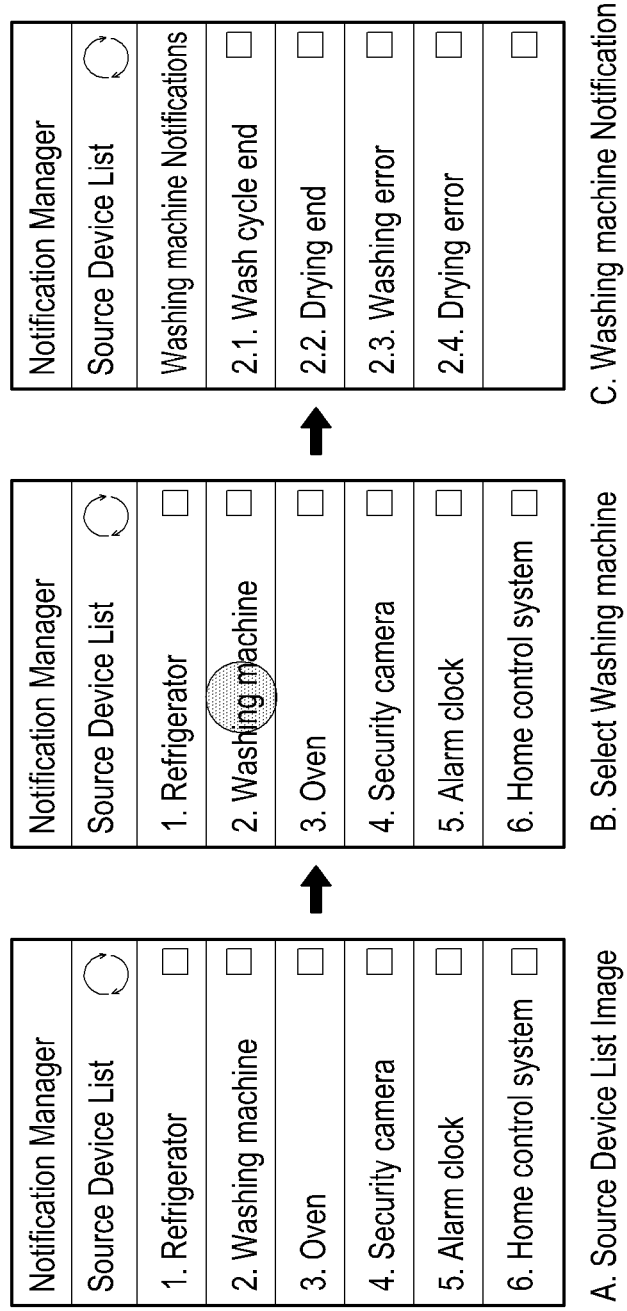
FIG. 6 illustrates an example of displaying messages or information of a first external device in an electronic device according to various embodiments of the present disclosure.

FIG. 6 illustrates an example of displaying messages or information of a first external device in an electronic device according to various embodiments of the present disclosure.

Referring to FIG. 6, the electronic device may determine whether or not the external devices, which are communication-connected with the electronic device, can send the messages or information (e.g., notification information) (e.g., whether or not they are source external devices).

As a result of the determination, if the external devices can send the messages or information (e.g., notification information), the electronic device may display "Source Device List" of "Notification manager" on the screen (see "A").

After that, for example, from among "1. Refrigerator," "2. Washing Machine," "3. Oven," "4. Security Camera," "4. Alarm Clock," and "6. Home Control System," the washing machine may be selected by the user (see "B"). Then, the electronic device may display "2.1 Washing End," "2.2 Drying End," "2.3 Washing Error," and "2.4 Drying Error," or the like as events or a notification list, which can be performed or displayed by the washing machine (see "C").

As described above, the electronic device according to an embodiment of the present disclosure, may display the messages or information (e.g., notification information) of the first external devices (e.g., source external devices).

Figure 7:
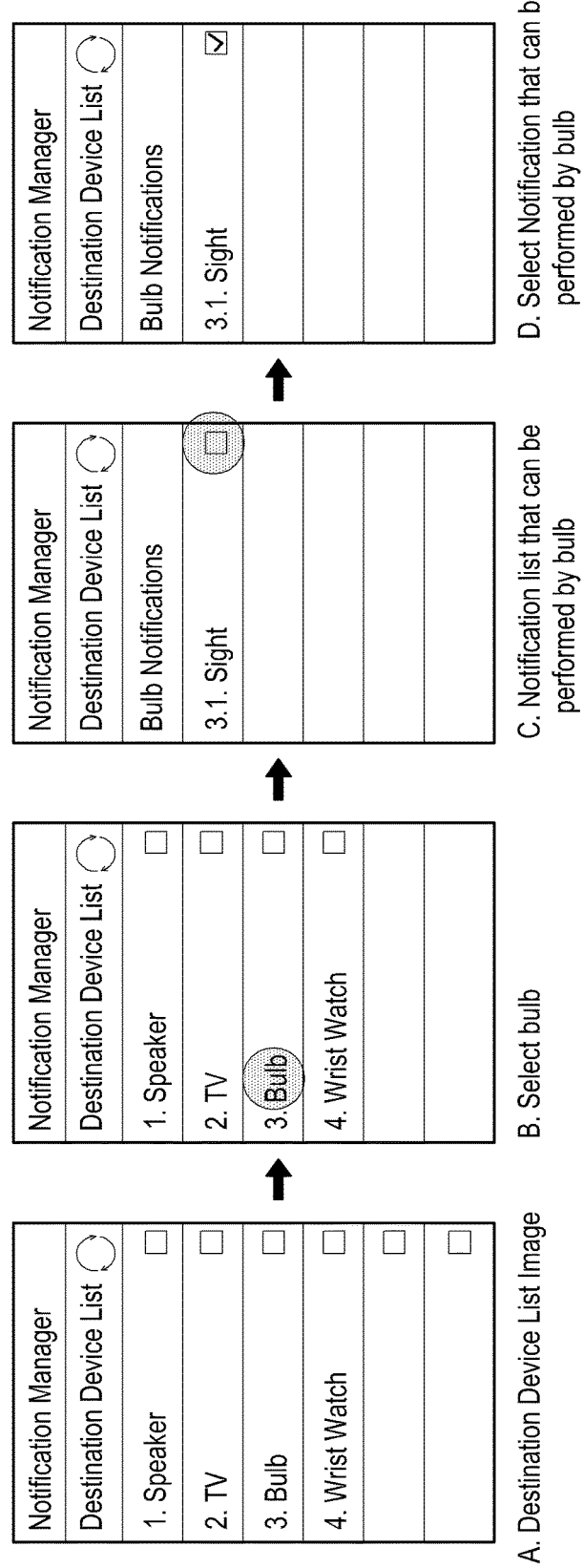
FIG. 7 illustrates an example in which an electronic device displays messages or information that can be notified by a second external device according to various embodiments of the present disclosure.

FIG. 7 illustrates an example in which an electronic device displays messages or information (e.g., notification information) that can be displayed by a second external devices according to various embodiments of the present disclosure.

Referring to FIG. 7, the electronic device may determine whether or not the external devices, which are connected with the electronic device, can receive the messages or information (e.g., notification information) to thereby display the messages or information (e.g., notification information) to the user (e.g., whether or not they are destination external devices).

As a result of the determination, if the external devices can display the messages or information (e.g., notification information) to the user, the electronic device may display "Destination Device List" of "Notification manager" on the screen image (see "A").

After that, from among "1. Speaker," "2. TV," "3. Bulb," and "4. Wrist Watch," the bulb may be selected by the user (see "B"). Then, the electronic device may display "Sight" as "Notification List," which can be performed by the bulb (see "C").

Subsequently, "Sight" displayed on the screen may be touched or selected by the user (see "D"). Thus, the bulb may receive the message or information (e.g., notification information) from the electronic device, and may emit light in order to visually display the message or information (e.g., notification information) to the user.

As set forth above, the electronic device according to an embodiment of the present disclosure, may control the second external devices (e.g., destination external device) to display the messages or information (e.g., notification information) to the user.

Figure 8:
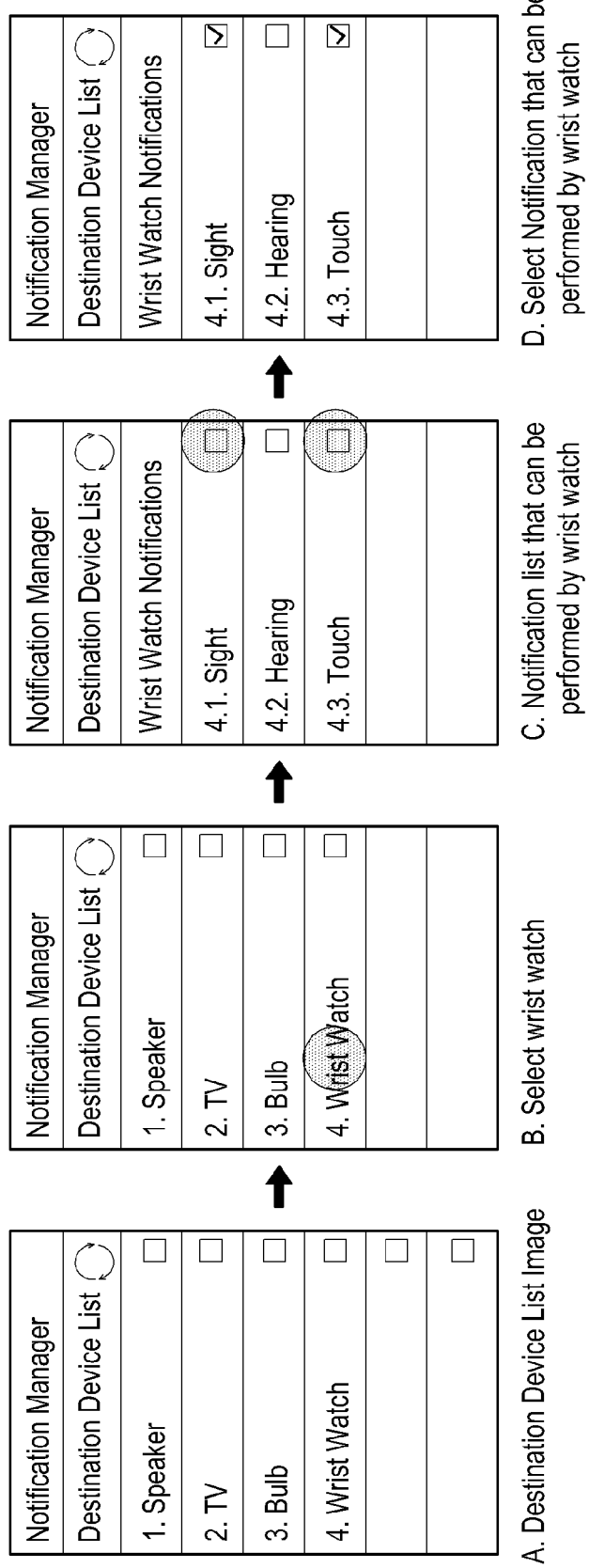
FIG. 8 illustrates an example in which an electronic device displays messages or information that can be notified by a second external device according to various embodiments of the present disclosure.

FIG. 8 illustrates an example in which an electronic device displays messages or information (e.g., notification information) that can be displayed by second external devices according to various embodiments of the present disclosure.

Referring to FIG. 8, the electronic device may determine whether or not the external devices, which can make communication, can receive the messages or information (e.g., notification information) to thereby display the messages or information (e.g., notification information) to the user (e.g., whether or not they are destination external devices).

As a result of the determination, if the external devices can display the messages or information (e.g., notification information) to the user, the electronic device may display "Destination Device List" of "Notification manager" on the screen (see "A").

After that, from among "1. Speaker," "2. TV," "3. Bulb," and "4. Wristwatch," the wristwatch may be selected by the user (see "B"). Then, the electronic device may display "Sight," "Hearing," and "Touch" as "Notification List," which can be performed by the wristwatch (see "C").

Subsequently, "Sight" and "Touch" displayed on the screen may be touched or selected by the user (see "D"). Thus, the wristwatch may receive the message or information (e.g., notification information) from the electronic device. Therefore, the wristwatch may emit light in order to visually display the message or information (e.g., notification information) to the user, or may make vibration or change in temperature in order to notify the message or information (e.g., notification information) to the user in a tactile manner.

As set forth above, the electronic device according to an embodiment of the present disclosure, may control the second external devices (e.g., destination external device) to notify the messages or information (e.g., notification information) to the user.

FIG. 9 illustrates an example in which an electronic device displays messages or information (e.g., notification information) that can be displayed by second external devices according to another embodiment of the present disclosure.

Referring to FIG. 9, the electronic device, according to an embodiment of the present disclosure, may be pre-configured in order to facilitate access to a hearing mode and a sight mode.

The electronic device may control to configure an impairment mode as a default or by the user's touch. In the configured hearing-impairment mode (see "A") according to an embodiment of the present disclosure (e.g., when the configured hearing-impairment mode is activated), the wristwatch may be selected (see "B").

When the wristwatch is selected as set forth above, the electronic device configured as the hearing-impairment mode, may display the hearing option to be disabled on the screen, or may not display the hearing option on the screen.

In the case in which the sight-impairment mode is configured according to another embodiment of the present disclosure, the electronic device may display the sight option to be disabled on the screen, or may not display the sight option on the screen. According to various embodiments of the present disclosure, the electronic devices described in FIGS. 4, 5, 6, 7, 8, and 9 may automatically configure designation of the external devices (e.g., source external devices and destination external devices), the notification type/display type, or the like. For example, the electronic device may be automatically configured in various manners on the basis of user preference, user profiles, other users/status information, or the like.

FIGS. 10A to 10C illustrate priority of external devices, which is configured by an electronic device according to various embodiments of the present disclosure.

Referring to FIGS. 10A to 10C, the electronic device 100 may give the first priority to the washing machine 1010 when the electronic device 100 is connected with the washing machine 1010 at home (e.g., within communication networks) 1000.

According to another embodiment of the present disclosure, the electronic device 100 may give the first priority to the TV 1020 and second priority to the washing machine 1010, respectively, when the electronic device 100 is connected with the TV 1020 and the washing machine 1010 at home (e.g., within communication networks) 1000.

According to another embodiment of the present disclosure, the electronic device 100 may give the first priority to the bulb 1030, the second priority to the TV 1020, and third priority to the washing machine 1010, respectively, when the electronic device 100 is connected with the bulb 1030, the TV 1020, and the washing machine 1010 at home (e.g., within communication networks) 1000.

The priority may be pre-set by the user. Alternatively, the priority may be pre-configured as a default in the electronic device 100. For example, the priority may be configured according to usage of the external devices or malfunction of the external devices. In addition, the priority may be adjusted according to user information or status information of the electronic device 100.

If it is determined that the bulb 1030, TV 1020 and washing machine 1010, which are in progress, are not in use by the user, the electronic device 100 may turn off the external devices on the basis of the priority.

The electronic device 100 may provide a context aware service, as follows.

According to an embodiment of the present disclosure, the user may watch the TV 1020 (e.g., the second external device) while the electronic device 100 communicates with the external devices. When the user goes to the rest room, the bulb (e.g., the first external device) 1030 is turned on. At the same time, the bulb 1030 may send a message or information (e.g., notification information, status information thereof, etc.) to the electronic device 100. After that, the electronic device 100 may determine that the user is not watching the TV 1020 at the moment, based on the message or information (e.g., notification information) of the bulb 1030. Then, the electronic device 100 may send the message or information (e.g., notification information) of the bulb 1030 to the TV 1020. Therefore, the TV 1020 may control itself to be turned off on the basis of the message or information (e.g., notification information). According to another embodiment of the present disclosure, when the wash cycle of the washing machine 1010 (e.g., the first external device) is completed with the electronic device 100 connected with the external devices, the washing machine 1010 may send a notification message stating that the wash cycle is complete to the electronic device 100. Then, the electronic device 100 may determine a location of the user (e.g., if the smart bulb in the rest room is turned on, the user may be determined to be in the rest room), and may send the notification message from the washing machine 1010 to the second external device (e.g., smart bulb) that is positioned at the location of the user. Thus, the smart bulb may provide an indication (e.g., blink), and the user may recognize that the wash cycle of the washing machine 1010 is complete by identifying the blinks of the smart bulb.

Figure 11:
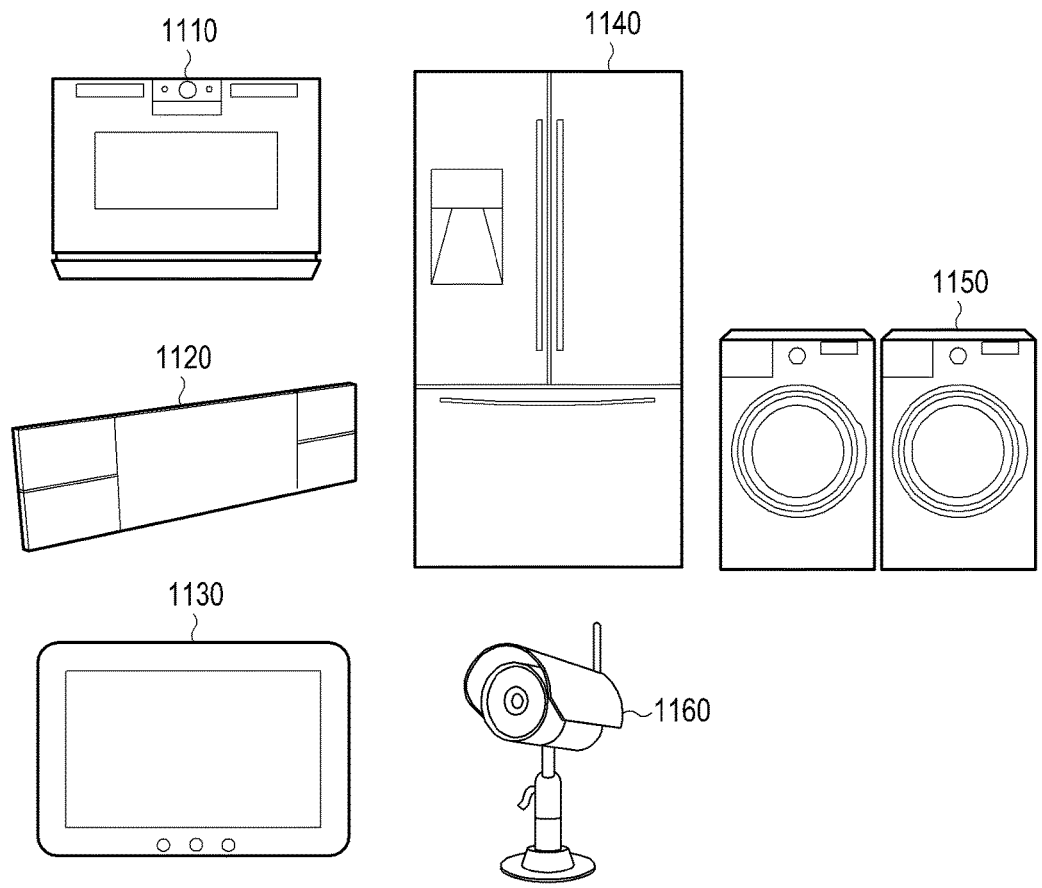
FIGS. 11, 12, and 13 illustrate examples of an electronic device and external devices according to various embodiments of the present disclosure.
Figure 12:
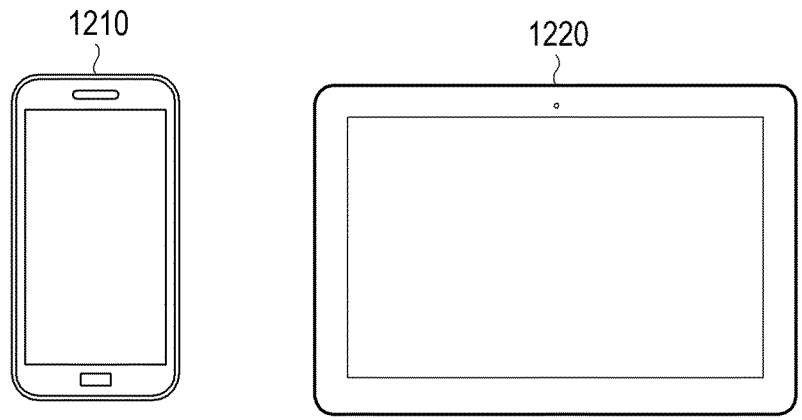
Figure 13:
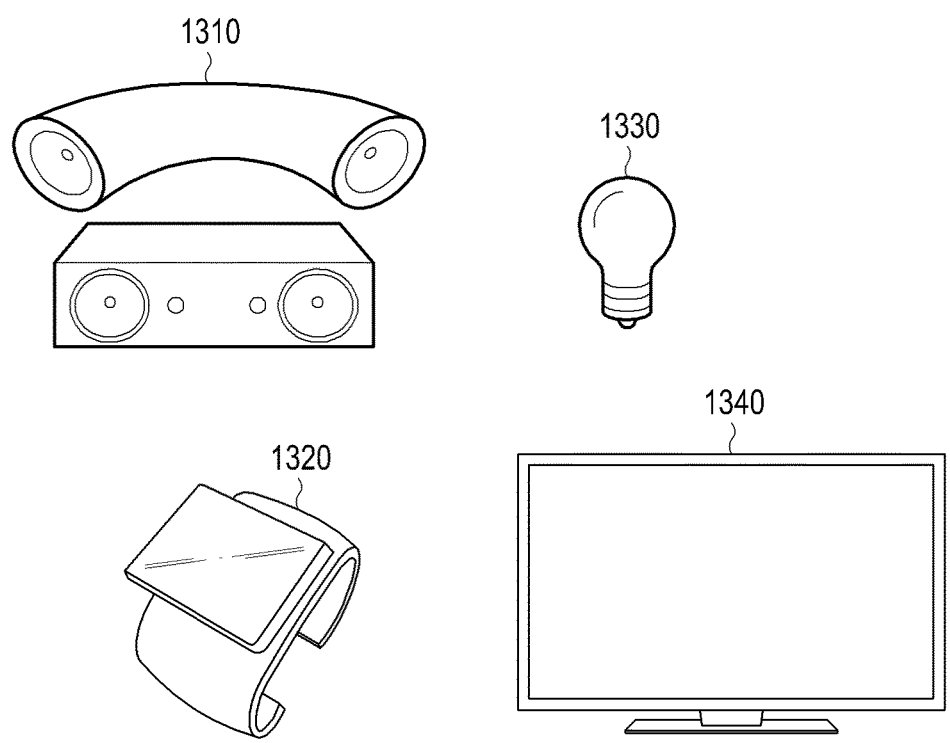

FIGS. 11, 12, and 13 illustrate an electronic device and external devices according to various embodiments of the present disclosure.

Referring to FIG. 11, the first external devices (e.g., source external devices) may include an oven 1110, a video 1120, a game player 1130, a refrigerator 1140, a washing machine 1150, a security camera 1160, or the like, but the first external devices are not limited thereto. For example, the source external devices are not limited to the devices shown in FIG. 11, and may be the electronic device or the destination external devices.

Referring to FIG. 12, the electronic device may be a smart phone 1210 and a tablet PC 1220, but it is not limited thereto. For example, the electronic device is not limited to the devices shown in FIG. 12, and may be the source external devices or the destination external devices.

Referring to FIG. 13, the second external devices (e.g., destination external devices) may include a speaker 1310, a wrist watch 1320, a bulb 1330, a TV 1340, or the like, but the second external devices are not limited thereto. For example, the destination external devices are not limited to the devices shown in FIG. 13, and may be the electronic device or the source external devices.

Figure 14:
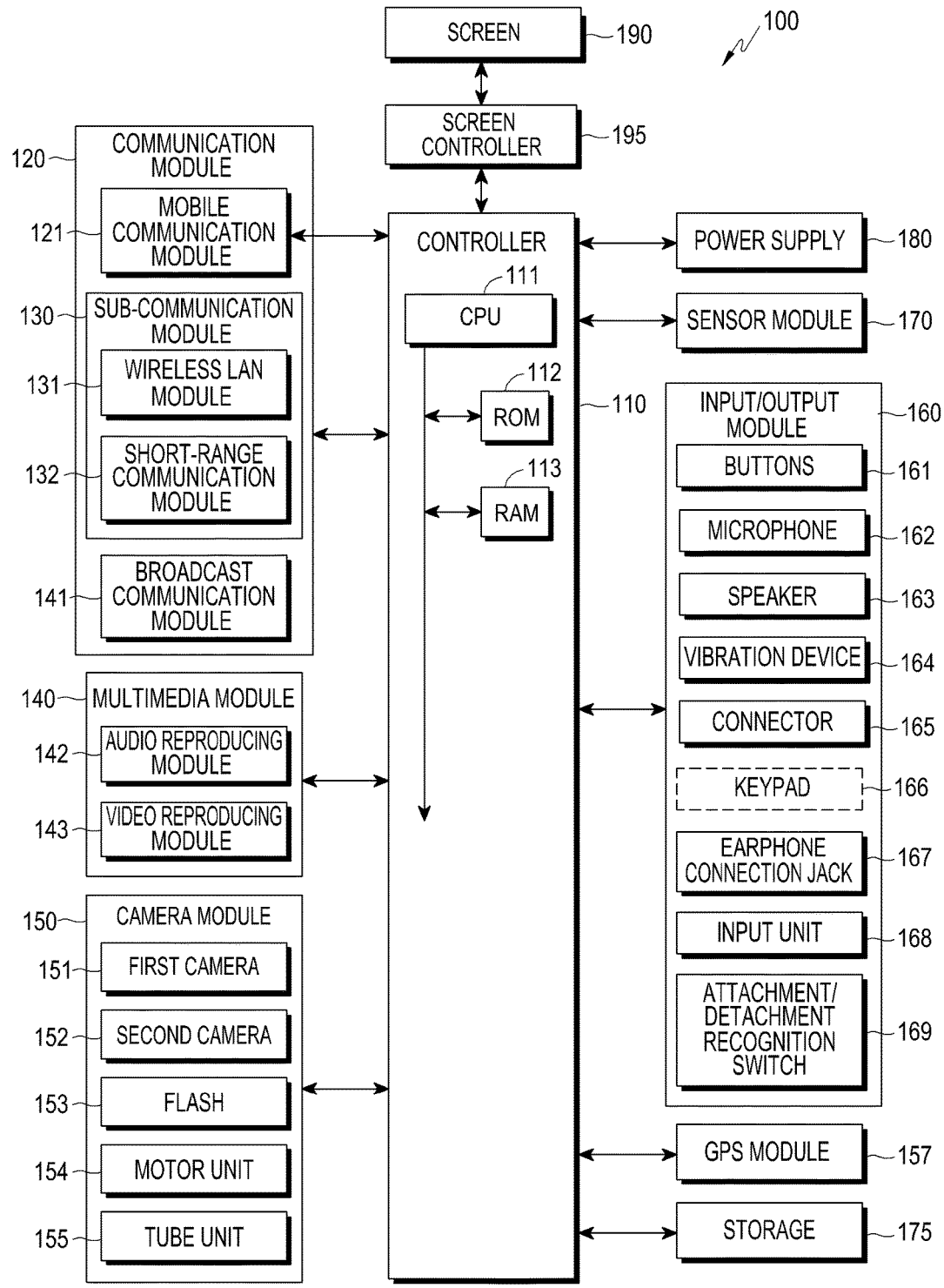
FIG. 14 is a block diagram illustrating a configuration of an electronic device according to various embodiments of the present disclosure.

FIG. 14 is a block diagram illustrating a configuration of an electronic device according to various embodiments of the present disclosure.

Referring to FIG. 14, the electronic device 100 may be connected with external electronic devices by using at least one of a communication module 120, a connector 165, or an earphone connection jack 167. The external electronic devices may include one of earphones, external speakers, universal serial bus (USB) memories, electric chargers, cradle/docks, DMB antennas, mobile payment-related devices, healthcare devices (e.g., blood sugar meter), game players, vehicle navigation devices, or the like, which are detachable from the electronic device 100 and connected by wired cables to the electronic device 100.

In addition, the electronic device may include, for wireless communication, Bluetooth communication devices, near field communication (NFC) devices, WiFi direct devices, wireless access points (WAPs), or the like. Furthermore, the electronic device 100 may be connected to one of other electronic devices, for example, mobile phones, smart phones, tablet PCs, desktop PCs, and servers by wired or wireless communication.

In addition, the electronic device 100 may include at least one screen 190 and at least one screen controller 195. Furthermore, the electronic device 100 may include a control unit 110, the communication unit 120, a multimedia module 140, a camera module 150, an input/output module 160, a sensor module 170, a memory 175 (i.e., storage), and a power supply unit 180.

The communication module 120 may include a mobile communication module 121, a sub-communication module 130, and a broadcast communication module 141. The sub-communication module 130 may include at least one of a wireless LAN module 131 and a short-range communication module 132. The multimedia module 140 may include at least one of an audio reproducing module 142 and a video reproducing module 143. The camera module 150 may include at least one of a first camera 151 and a second camera 152. In addition, the input/output module 160 may include at least one of a button 161, a microphone 162, a speaker 163, a vibrating device 164, the connector 165 and a keypad 166.

The control unit 110 may include a central processing unit (CPU) 111, a ready only memory (ROM) 112 that stores control programs for controlling the electronic device 100, and a random access memory (RAM) 113 that memorizes signals or data input from the outside of the electronic device 100 or that is used as a memory area for operations performed in the electronic device 100. The CPU 111 may include a single core, dual cores, triple cores, or quad cores. The CPU 111, the ROM 112 and the RAM 113 may be connected with each other through an internal bus.

In addition, the control unit 110 may control at least one of the communication module 120, the multimedia module 140, the camera module 150, the input/output module 160, the sensor module 170, the memory 175, the power supply unit 180, the screen 190, and the screen controller 195.

Furthermore, the control unit 110 may detect user's events such as a hovering event by which an input unit 168 approaches the screen 190 or is positioned in proximity to the screen 190. The control unit 110 may detect various user inputs that are received through the input/output module 160, the sensor module 170, or the like as well as the screen 190. The user's inputs may include various inputs such as a user's gestures, voices, movement of eyes, iris recognition, bio signals, or the like, which are received by the electronic device 100. The control unit 110 may control to execute a predetermined operation or function in response to the detected user input in the electronic device 100.

In addition, the control unit 110 may output control signals to the input unit 168 or the vibrating device 164. The control signals may include information on the vibrating pattern, and the input unit 168 or the vibrating device 164 may generate a vibration according to the vibrating pattern. The information of the vibrating pattern may include a vibrating pattern and an identifier of the vibrating pattern. Alternatively, the control signals may include only a request for vibration.

The electronic device 100 may include at least one of the mobile communication module 121, the wireless LAN module 131, or the short-range communication module 132 depending on the performance thereof.

The mobile communication module 121 may allow the electronic device 100 to connect with the external devices through mobile communication by using one or more antennas under the control of the control unit 110. The mobile communication module 121 may transmit and receive wireless signals for voice calls, video calls, short message service (SMS) or multimedia messaging service (MMS) with mobile phones, smart phones, tablet PCs, or the second electronic devices, which have telephone numbers entered into the electronic device 100.

The sub-communication module 130 may include at least one of the wireless LAN module 131, or the short-range communication module 132. For example, the sub-communication module 130 may include only one of the wireless LAN module 131 and the short-range communication module 132, or may include both of the same.

The wireless LAN module 131 may connect with the Internet at the place where the WAPs are installed. The wireless LAN module 131 may support the wireless LAN standard (IEEE 802.11x) of Institute of Electrical and Electronics Engineers (IEEE). The short-range communication module 132 may make short-range communication between the electronic device 100 and the external devices under the control of the control unit 110. The short-range communication may include Bluetooth, infrared data association (IrDA), WiFi direct communication, NFC, or the like.

The broadcast communication module 141 may receive broadcasting signals (e.g., TV broadcasting signals, radio broadcasting signals, or data broadcasting signals) and broadcasting added information {e.g., Electric Program Guide (EPS) or Electric Service Guide (ESG)} transmitted from broadcasting stations through a broadcast communication antenna according to the control of the control unit 110.

The multimedia module 140 may include the audio reproducing module 142 and the video reproducing module 143. The audio reproducing module 142 may reproduce digital audio files (e.g., files having file extensions of mp3, wma, ogg, or way) stored or received according to the control of the control unit 110. The video reproducing module 143 may reproduce digital movie files (e.g., files having file extensions of mpeg, mpg, mp4, avi, mov, or mkv) stored or received according to the control of the control unit 110.

The multimedia module 140 may be integrated in the control unit 100. In addition, the camera module 150 may include at least one of a tube unit 155 for zooming in/out the object, a motor unit 154 for controlling movement of the tube unit 155, and a flash 153 as an auxiliary light to photograph the object. The first camera 151 may be disposed on the front side of the electronic device 100, and the second camera 152 may be disposed on the rear side of the electronic device 100.

The input/output module 160 may include at least one of at least one button 161, at least one microphone 162, at least one speaker 163, at least one vibrating device 164, a connector 165, a keypad 166, an earphone connection jack 167, or the input unit 168. The input/output module 160 is not limited thereto, and may include cursor controllers such as a mouse, a track ball, a joystick, cursor direction keys, or the like, in order to control movement of the cursor on the screen 190.

The buttons 161 may be provided on the front, side or rear surfaces of a housing (or case) of the electronic device 100, and it may include at least one of a power/pause button, a volume button, a menu button, a home button, a back button, and a search button. The microphone 162 may receive voices or sounds and may convert the same into electrical signals according to the control of the control unit 110. The speaker 163 may output various sounds corresponding to various signals or data (e.g., wireless data, broadcasting data, digital audio data, digital movie data, or the like)

outwards according to the control of the controller 110. The speaker 163 may output sounds corresponding to functions performed by the electronic device 100 (e.g., button sound, ring back tone, or receiver's voice corresponding to phone call function). One or more speakers 163 may be provided at proper positions of the housing of the electronic device 100.

The vibrating device 164 may convert an electric signal to a mechanical vibration according to the control of the control unit 110. For example, when the electronic device 100 in a vibration mode receives a voice call or a video call from other devices, the vibrating device 164 will operate. One or more vibrating device 164 may be provided in the housing of the electronic device 100. The vibrating device 164 may operate in response to a user's input through the touch screen 190.

The connector 165 may be used as an interface to connect the electronic device 100 to the external devices or power sources. The control unit 110 may transmit data stored in the memory 175 of the electronic device 100 to the external electronic devices, or may receive data from the external electronic devices, through wired cables connected to the connector 165. The electronic device 100 may receive power from a power source through wired cables connected to the connector 165 to thereby charge a battery.

The keypad 166 may receive a key input from the user for controlling the electronic device 100. The keypad 166 may include a physical keypad provided in the electronic device 100, or a virtual keypad displayed on the screen 190. The physical keypad provided in the electronic device 100 may be omitted according to the performance or the structure of the electronic device 100. The earphone may be inserted into the earphone connection jack 167 to be thereby connected to the electronic device 100.

The input unit 168 may be inserted into the electronic device 100 to be thereby kept therein, and may be taken or detached from the electronic device 100 for use. An attachment/detachment recognition switch 169 may be provided at the position inside the electronic device 100, where the input unit 168 is inserted, and may be operated in response to attachment and detachment of the input unit 168. The attachment/detachment recognition switch 169 may output signals corresponding to attachment and detachment of the input unit 168 to the control unit 110. The attachment/detachment recognition switch 169 may be configured to contact the input unit 168 directly or indirectly on attachment of the input unit 168. Therefore, the attachment/detachment recognition switch 169 may create signals (e.g., signals informing attachment and detachment of the input unit 168) corresponding to the attachment and detachment of the input unit 168 on the basis of the contact with the input unit 168 to thereby output the same to the control unit 110.

The sensor module 170 includes at least one sensor for detecting a state of the electronic device 100. For example, the sensor module 170 may include at least one of a proximity sensor for detecting proximity of a user to the electronic device 100, an illuminance sensor for detecting the intensity of light around the device 100, a motion sensor for detecting operations (e.g., rotation, acceleration or vibration of electronic device 100) of the electronic device 100, a geo-magnetic sensor for detecting the point of the compass by using a geo-magnetic field, a gravity sensor for the direction of gravity, an altimeter for detecting the altitude by measuring atmospheric pressure, a GPS module 157, or the like.

The GPS module 157 may receive radio waves from a plurality of GPS satellites in Earth's orbit and may determine the location of the electronic device 100 by using time of arrival of the radio waves from the GPS satellites to the electronic device 100.

The memory 175 may store signals or data input/output in response to operations of the mobile communication module 120, the multimedia module 140, the camera module 150, the input/output module 160, the sensor module 170, and the screen 190, under the control of the control of the control unit 110. The memory 175 may store control programs for controlling the electronic device 100 or the control unit 110 and applications.

The term "memory" may be interpreted to include the memory 175, the ROM 112 and the RAM 113 in the control unit 110, and memory cards (e.g., SD cards, and memory sticks) installed in the electronic device 100. The memory 175 may include non-volatile memories, volatile memories, hard disk drives (HDDs), or solid state drives (SSDs).

In addition, the memory 175 may store various applications, such as a navigation, video calls, games, time-based alarm applications, or the like, images to provide a graphical user interface (GUI) related to the applications, data base or data regarding user information, documents and methods for processing touch-inputs, background images (e.g., a menu screen image, an standby screen image, or the like) for operating the electronic device 100, management applications, photo images taken by the camera module 150, or the like.

The memory 175 may be an apparatus (e.g., computer) readable storage medium, and the apparatus-readable storage medium may be defined as the medium that provides data to the apparatus to thereby execute a specific function. The memory 175 may include a non-volatile medium and a volatile medium. The medium may be configured so that instructions transferred by the medium can be detected by a physical mechanism of the apparatus, which reads the instructions.

The apparatus-readable storage medium may include, but not limited to, at least one of a floppy disk, a flexible disk, a hard disks, a magnetic tape, a Compact Disc Read-Only Memory (CD-ROM), an optical disk, a punch card, a paper tape, a RAM, a Programmable Read-Only Memory (PROM), an Erasable PROM (EPROM), a Flash-EPROM, or the like.

The power supply 180 may supply power to one or more batteries disposed in the housing of the electronic device 100 according to the control of the control unit 110. One or more batteries supply power to the electronic device 100. In addition, the power supply 180 may supply power input from the external power source to the electronic device 100 through a wired cable connected with the connector 165. In addition, the power supply unit 180 may supply power wirelessly input from the external power source by wireless charging technology.

In addition, the electronic device 100 may include at least one screen 190 that provides user graphic interfaces corresponding to various services (e.g., phone calls, data transmission, broadcasting, photographing, or the like) to the user. The screen 190 may output analog signals corresponding to at least one user input through the user graphic interfaces to the screen controller 195.

The screen 190 may receive at least one user input through the user's body (e.g., fingers including thumb) or the input unit 168 (e.g., stylus pens, electronic pens, or the like). The screen 190 may be implemented by a resistive type, a capacitive type, an infrared type, an acoustic wave type, or a combination thereof.

In addition, in order to receive inputs of fingers and the input unit 168, the screen 190 may include two or more touch panels that can detect a touch of proximity of the fingers and the input unit 168. Two or more touch panels may provide different output values to the screen controller 195, respectively, and the screen controller 195 may identify the different output values from the touch panels to thereby determine whether the input stems from the fingers or the input unit 168.

In addition, the touches may include the non-contact operation (e.g., distance between the screen 190 and the user's body or touchable input means is less than 1 mm) as well as the contact operation between the screen 190 and the user's body or the touchable input means. The distance that can be detected on the screen 190 may vary with the performance or structure of the electronic device 100.

The screen controller 195 converts analog signals from the screen 190 into digital signals to thereby transmit the same to the control unit 110. The control unit 110 may control the screen 190 by using the digital signals received from the screen controller 195. The screen controller 195 may detect output values (e.g., current value) through the screen 190 to thereby identify the user input position and the hovering distance or gap, and may convert the identified distance values into digital signals (e.g., Z-coordinate) to thereby provide the same to the control unit 110. In addition, the screen controller 195 may detect output values (e.g., current value) through the screen 190 to thereby detect the pressure on the screen 190 by the user input means, and may convert the identified pressure value into a digital signal to thereby provide the same to the control unit 110.

Figure 15:
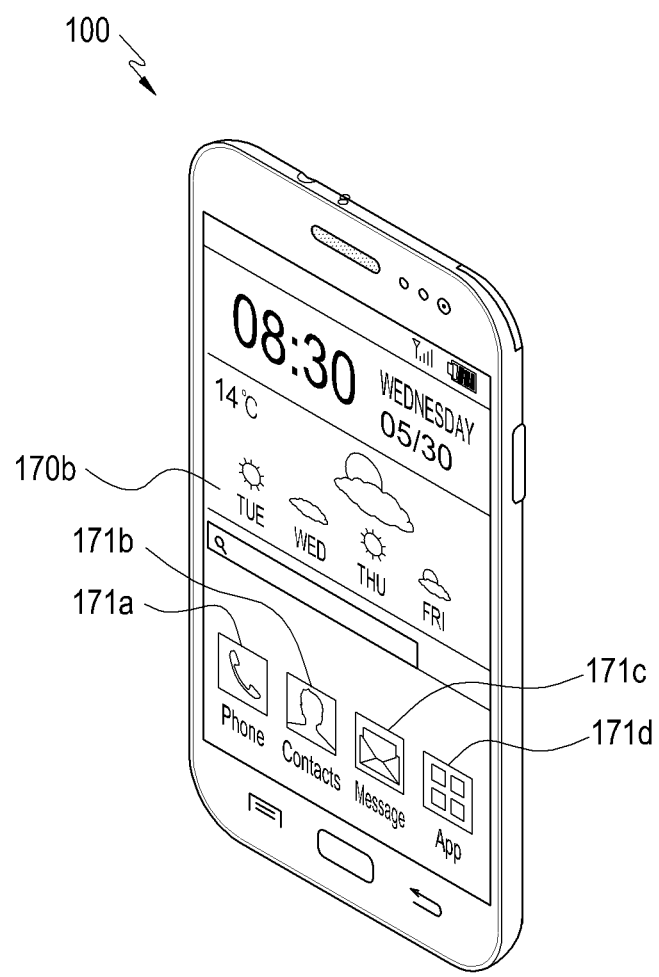
FIG. 15 illustrates an example of an electronic device according to various embodiments of the present disclosure.

FIG. 15 illustrates an example of an electronic device according to various embodiments of the present disclosure.

Referring to FIG. 15, the electronic device 100, according to various embodiments of the present disclosure, may be a PC, a tablet PC, a mobile phone, etc., but it is not limited thereto and may be comprised of various devices.

Referring to FIG. 15, a screen 170b is disposed on the front surface of the electronic device 100. The screen 170b may be formed to occupy most of the front surface of the electronic device 100.

In addition, the electronic device 100 may have various home screen images, and the first home screen image may be the main home screen image as shown in FIG. 15. The home screen image may display icons 171a, 171b and 171c, a main menu key 171d, time, weather, or the like. The main menu key 171d may display a main menu image on the screen 170b. In addition, a status bar showing the status of the electronic device 100, such as battery percentage, the intensity of a received signal, a current time, the volume operation mode, or the like, may be provided at the upper portion of the screen.

The above-described methods according to various embodiments of the present disclosure may be implemented in the form of program instructions executable through various computer means and may be recorded in a computer-readable medium. The computer readable medium may include a program command, a data file, a data structure, and the like independently or in combination. The program instructions recorded in the medium may be specially designed and configured for the present disclosure, or may be known to and usable by those skilled in the field of computer software.

Further, the methods according to various embodiments of the present disclosure may be implemented in a program instruction form and stored in the storage unit 175 of the above-described apparatus 100, and the program command may be temporarily stored in the RAM 113 included in the controller 110 in order to execute the methods according to various embodiments of the present disclosure. Accordingly, the controller 110 may control hardware components included in the apparatus 100 in accordance with the program command based on the methods according to various embodiments of the present disclosure, temporarily or continuously store data generated during the execution of the methods according to various embodiments of the present disclosure in the storage unit 175, and provide a UI required for executing the methods according to various embodiments of the present disclosure to the display controller 195.

While the present disclosure has been shown and described with reference to various embodiments thereof, it will be understood by those skilled in the art that various changes in form and details may be made therein without departing from the spirit and scope of the present disclosure by the appended claims and their equivalents.

What is claimed is:

1. A method by an electronic device, in a smart-home system, configured to communicate with a plurality of external electronic devices of the smart-home system, the method comprising:

receiving, by the electronic device, a first notification message from a first external electronic device among the plurality of external electronic devices about a current status of the first external electronic device, wherein the first external electronic device is previously set as a source device, the plurality of external electronic devices each using different communication methods from each other for communicating with the electronic device so that the source device and at least one second external electronic device from the plurality of external electronic devices can communicate with each other using the electronic device, the at least one second external electronic device being set as a destination device;

selecting the destination device in response to the first notification message;

determining whether the selected destination device is available for performing an action representing the first notification message;

if the destination device is available for performing an action representing the first notification message, creating a second message for representing the first notification message;

sending the created second message to the destination device; and performing, by the destination device, the action representing the first notification message, wherein the first notification message comprises a control command for controlling the selected destination device, and wherein the selecting of the destination device comprises:

if the source device needs to notify a user of the smart-home system about the current status of the source device, the electronic device identifies a location of the user by identifying an external electronic device from the plurality of external electronic devices that the user is using and selects the identified external electronic device as the destination device;

if the source device notifies the electronic device that the user of the smart-home system is using the source device, and the electronic device identifies that the user left unattended an external electronic device, or that the user is going to operate the external electronic device, the electronic device selects the external electronic device as the destination device and sends the created second message indicating that the selected destination device controls itself on a basis of the first notification message.

2. The method of claim 1, further comprising connecting with the first external electronic device or the at least one second external electronic device by at least one of a plurality of communication methods.

3. The method of claim 2,
wherein the first external electronic device is connected by a first communication method, and
wherein the at least one second external electronic device is connected by a second communication method that is different from the first communication method.

4. The method of claim 1, wherein the receiving of the first notification message comprises receiving the first notification message that is sent from the first external electronic device by a broadcasting method.

5. The method of claim 1, wherein the second message to be sent to the at least one second external electronic device comprises at least one information related to a status of the first external electronic device or control information for representing the first notification message to the representation type set.

6. The method of claim 1, wherein the second message to be sent to the at least one second external electronic device comprises control information for the at least one second external electronic device, which is configured to correspond to status information of the first external electronic device included in the message received from the first external electronic device.

7. The method of claim 1, further comprising:
identifying a third external electronic device from among the plurality of external electronic devices to which the second message is also to be sent in response to the first notification message; and
assigning a priority to each of the second and third external electronic devices.

8. The method of claim 7, wherein the priority is assigned based on a usage or a malfunction of the at least one second external electronic device.

9. The method of claim 7, further comprising:
adjusting the priority based on at least one of user information and status information.

10. The method of claim 1, wherein the first external electronic device and the at least one second external electronic device are a source external device and a destination external device, respectively.

11. An electronic device comprising:
a storage configured to store instructions therein;
a transceiver configured to communicate with a first external electronic device among a plurality of external electronic devices of a smart-home system, the plurality of electronic devices each using different communication methods from each other for communicating with the electronic device so that a source device and at least one second external electronic device from the plurality of external electronic devices can communicate with each other using the electronic device, the at least one second external electronic device being set as a destination device; and
at least one processor,
wherein, upon execution of the instructions, the at least one processor is configured to:
receive a first notification message is from the first external electronic device from among the plurality of external electronic devices about a current status of the first external electronic device, wherein the first external electronic device is previously set as the source device,
select the destination device in response to the first notification message,
determine whether the selected destination device is available for performing an action representing the first notification message,
if the destination device is available for performing the action representing the first notification message, create a second message for representing the first notification message, and
send the created second message to the destination device,
wherein the first notification message comprises a control command for controlling the selected destination device, and
wherein the selecting of the destination device comprises:
if the source device needs to notify a user of the smart-home system about the current status of the source device, the electronic device identifies a location of the user by identifying an external electronic device from the plurality of external electronic devices that the user is using and selects the identified external electronic device as the destination device;
if the source device notifies the electronic device that the user of the smart-home system is using the source device, and the electronic device identifies that the user left unattended an external electronic device, or that the user is going to operate the external electronic device, the electronic device selects the external electronic device as the destination device and sends the created second message indicating that the selected destination device controls itself on a basis of the first notification message.

12. The electronic device of claim 11, wherein the transceiver is further configured to connect with the first external electronic device or the at least one second external electronic device by at least one of a plurality of communication methods.

13. The electronic device of claim 12, wherein the transceiver is further configured to communicate with the first external electronic device by a first communication method, and to communicate with the at least one second external electronic device by a second communication method that is different from the first communication method.

14. The electronic device of claim 11, wherein the transceiver is further configured to receive the first notification message that is sent from the first external electronic device by a broadcasting method.

15. The electronic device of claim 11, wherein the second message to be sent to the at least one second external electronic device comprises information related to a status of the first external electronic device.

16. The electronic device of claim 11, wherein the second message to be sent to the at least one second external electronic device comprises control information for the second external electronic device, configured to correspond to status information of the first external electronic device included in the message received from the first external electronic device.

17. The electronic device of claim 11, wherein the at least one processor is further configured to assign a priority to the at least one second external electronic device, and at least one other external electronic device among the plurality of external electronic devices.

18. The electronic device of claim 17, wherein the at least one processor is further configured to assign the priority based on a usage or a malfunction of the at least one second external electronic device.

19. The electronic device of claim 17, wherein the at least one processor is further configured to adjust the priority depending on user information or status information.

\* \* \* \* \*